(No Model.) 2 Sheets—Sheet 2.

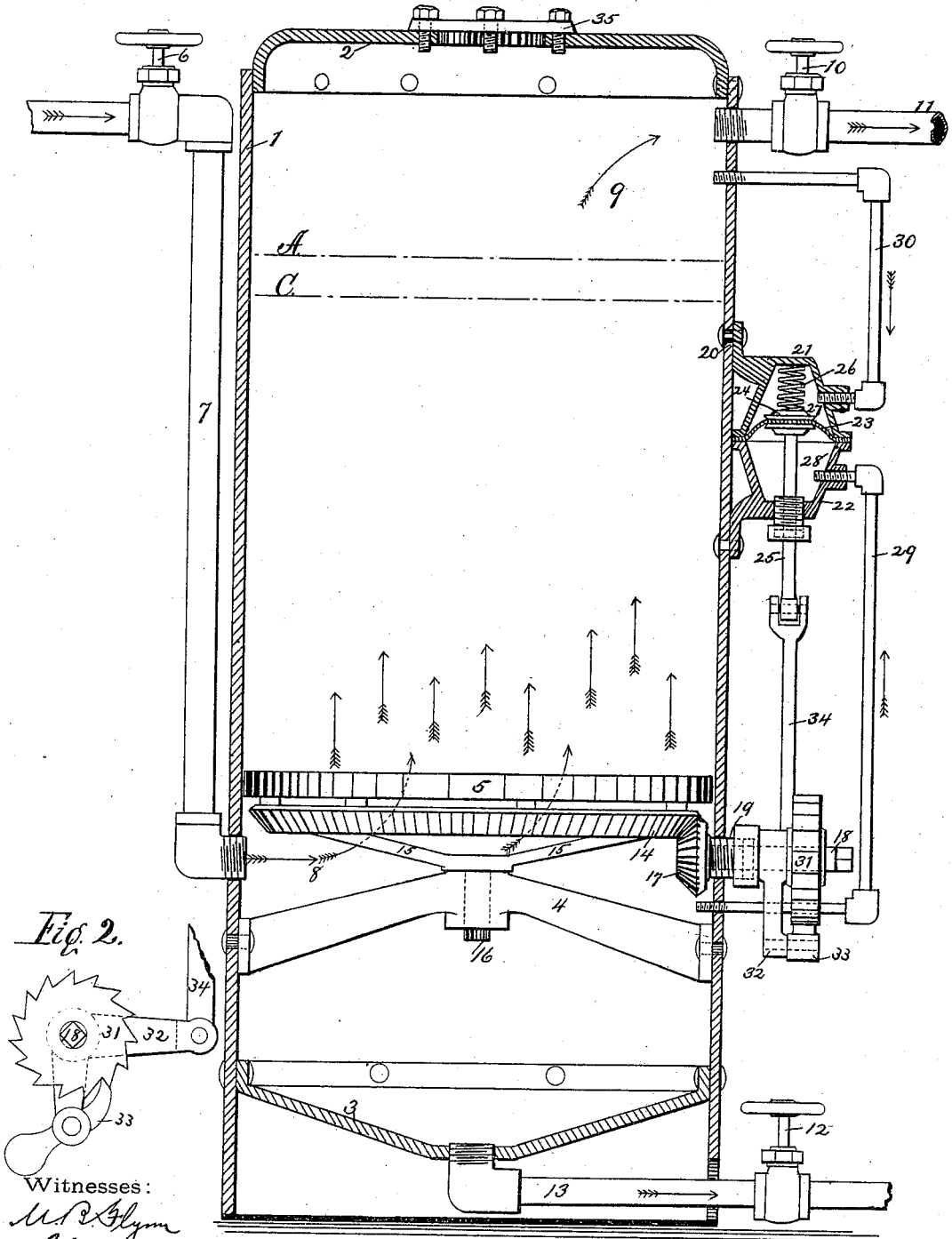
(No Model.) 2 Sheets—Sheet 1.
J. THOMSON.
FILTER.
No. 320,985. Patented June 30, 1885.

J. THOMSON.
FILTER.

No. 320,985. Patented June 30, 1885.

Witnesses:

Inventor: John Thomson

UNITED STATES PATENT OFFICE.

JOHN THOMSON, OF BROOKLYN, NEW YORK.

FILTER.

SPECIFICATION forming part of Letters Patent No. 320,985, dated June 30, 1885.

Application filed May 1, 1884. (No model.)

*To all whom it may concern:*

Be it known that I, JOHN THOMSON, a citizen of the United States, and a resident of Brooklyn, in the county of Kings and State of New York, have invented certain new and useful Improvements in Filters, of which the following is a specification.

My invention relates to "filters."

The essential features embodied in and the objects of this invention are the production of an apparatus for the clarification of fluids, which shall be perfect, rapid, and uniform in its operation and results, cheap in construction, and automatic in operation, to maintain a uniform efficiency of and flow of fluid through the defecating medium.

Figure 3:
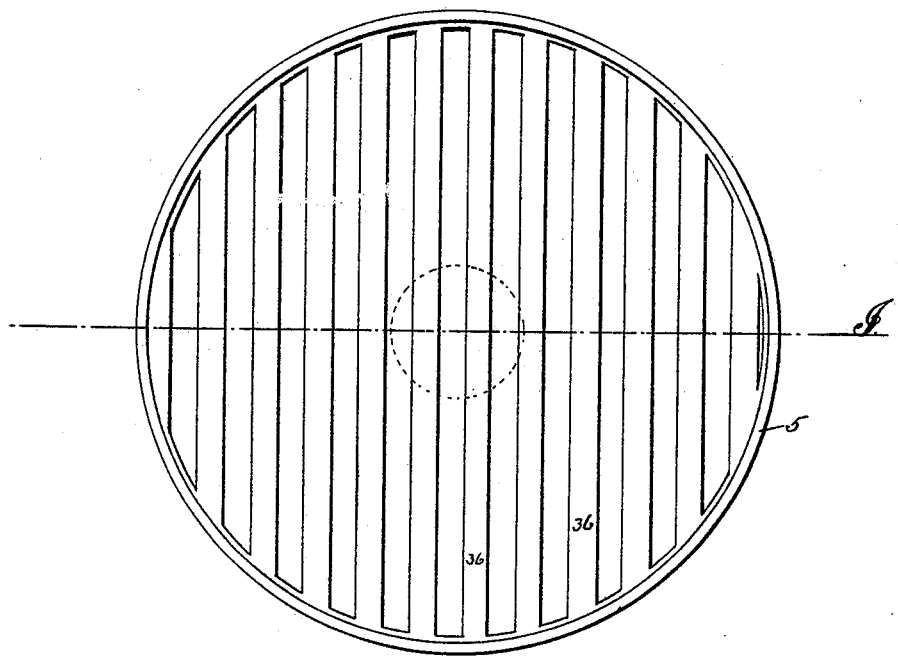
Figure 4:
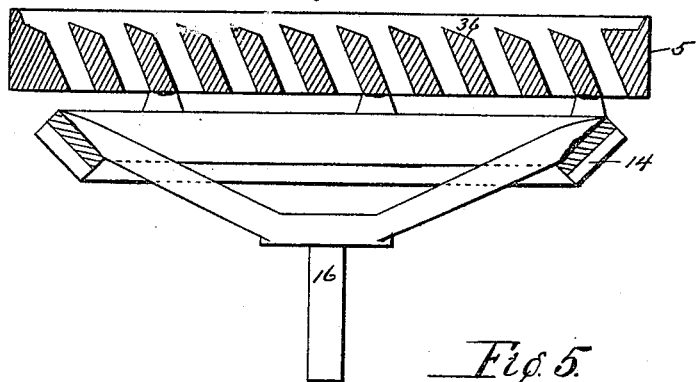
Figure 5:

In the drawings, Figure 1 is a vertical section through the cylinder or case, exposing the operating devices in upright elevation. Fig. 2 is a detached portion, in side elevation, of feed mechanism. Fig. 3 is a detached plan view enlarged of the grate used to sustain the defecating medium. Fig. 4 is a transverse section of the same on line I, showing the manner of its attachment to the gear and pivot, and Fig. 5 is a transverse section embodying modifications in the form of the grate-bars.

The case or main portion is formed of the cylinder 1, inclosed at its ends by upper and lower "crown-sheets," 2 3. Within the lower portion of the cylinder and secured thereto is a girder or bracket, 4, upon which is pivotally supported a grate, 5, fitted closely to but free of the cylinder. The spaces between the grate-bars are such that the defecating material to be sustained will not fall through freely. Assume the cylinder to be filled with any suitable granular defecating substance from the upper surface of the grate to the line C. Upon opening the inlet-valve 6 the fluid will follow down the ingress-pipe 7, entering the ingress-chamber 8 beneath the grate; thence passing up, as indicated by the arrows, through the porous bed to the egress-chamber 9 and out through the outlet-valve 10 and egress-pipe 11. Of course it will be apprehended that if the source and means of supply are natural the surface or "head" must be above the horizontal plane of the egress-pipe, the fluid thereby deriving the energy necessary to pass the defecating-bed from the force of gravity acting first upon the descending column.

While the current which passes the ingress-pipe may have a high velocity, it will be apparent that upon entering the relatively vast area of the ingress-chamber the velocity will be distributed and relatively diminished; hence the foreign particles in suspension of greatest specific gravity will have the more opportunity to gravitate—"settle"—toward the lower crown-sheet, 3, without suffering impingement against the grate or bed. Upon stopping the flow of fluid the current-pressure—the tendency of which is to lift the porous bed—is thereby removed, and such matter of consequence as may have collected upon the surface of the bed and grating is loosened and settles to the bottom of the chamber.

To empty the chamber of the filth that will thus collect, it is simply necessary to open the waste-valve 12, when the ingress current will pass directly out through the waste-pipe 13, forcing all waste material before it. To facilitate this, the crown-sheet is formed concave or cone-shaped, as shown.

To cleanse the ingress side of the defecating-bed of such foreign matter as may collect upon its surface, it is simply necessary to close the inlet-valve, and then to open the outlet and waste valve, permitting the fluid to escape from the egress-chamber back by infiltration to the ingress-chamber and out through the waste-pipe; or the process may be as follows: First close the inlet-valve and open the outlet and the waste valve, permitting a portion to escape quickly from the ingress-chamber; then open the inlet-valve, when the ingress-current will pass directly through the ingress-chamber and out of the waste-pipe. This manipulation of the valves will produce a partial vacuum within the ingress-chamber, in consequence of the ingress-current passing directly through the partially-filled chamber of the cylinder, thus causing the air to suddenly fill the egress-chamber, exerting a pressure to force whatever remaining fluid there may be in the chamber downward through the bed, to establish equilibrium with the vacuum of the ingress-chamber; therefore as that portion of the defecating-bed coated with foul matter will present the greatest resistance to the back-flow of the current, it is evident that the quick reversion of the flow and the shock will precipitate such matter as may have collected upon the surface of the bed downward to the filth-crown of the ingress-chamber, thus cleansing the surface of the bed.

To still further maintain the efficiency of the defecating-bed, I form upon the lower portion of the grate a bevel gear-wheel, 14, from which extend arms 15, all connecting to the hub of the pivot 16, journaled in the girder. Intermeshing with this gear is a pinion, 17, the journal-bearing of which, 18, projects out through a stuffing-box, 19, in the cylinder. It will now be apparent that by imparting motion to the pinion in either or both directions the grate will be caused to rotate under the surface of the bed, the consequence of which is that the effete and foul portion of the bed is scraped off and deposited in the filth-crown, much as in the instance of a stove or furnace when being "shook down."

As the defecating material used is frequently of but little specific gravity—as sawdust, charcoal, &c.—and therefore tends to "float," I in such cases cover the upper surface of the bed C with a layer of fine sand or gravel, as from C to A, of sufficient weight and quantity to insure a prompt and even displacement of the mass beneath when the grate is being operated. This layer of greater specific gravity also provides against particles of the bed from floating away with the egress-current.

It is of course evident that the operation of the pinion may be effected manually, when required, or by a system of external gearing driven continuously or intermittently by extraneous power at such a mean of rotation as would give fairly satisfactory results. In the device here shown, however, I overcome the objections that might be cited to the arrangements referred to in the following manner: Attached to the outside of the main cylinder at 20 is a small sub-cylinder formed of two parts—an upper, 21, and a lower, 22. Between the flanges is secured a flexible diaphragm, 23, having a central piston, 24, and piston-rod 25. Between the inner surface of the crown of the upper cylinder and the upper surface of the piston is interposed a helical spring, 26, which operates expansively. The said diaphragm and piston thus divide the cylinder into two compartments—an upper, 27, and a lower, 28. The lower compartment is connected by a pipe, 29, to the ingress-chamber of the main cylinder, while the upper compartment is connected by a pipe, 30, to the egress-chamber of the main cylinder. Fast to the pinion-shaft is a ratchet-wheel, 31, and mounted upon the same shaft is a bell-crank, 32, free to be vibrated, and which carries a pawl, 33, operating in the ratchet-wheel, the said bell-crank being connected to the piston-rod by the link 34.

It will thus be seen that any difference of pressure between the ingress and egress portions of the main cylinder will impart a reciprocating motion to the diaphragm, piston, and connecting parts, and will thereby rotate the grate and displace a portion of the bed. With the inlet-valve open and the outlet and waste valves closed, the pressure within the cylinder will be alike at all portions; hence the spring 26 will act to reset the piston and parts to a reversed position from that assumed in the figure. Upon opening the outlet-valve the effect will be to cause a difference in the pressure between the ingress and egress chambers, due to the frictional resistance of the defecating-bed upon the fluid. This, however, will not be a constant coefficient, but will vary with the quantity and character of foul matter disposed upon the ingress side of the bed; hence the pressure in the ingress-chambers of the main and sub-cylinders will gradually rise with the increment of matter until the grate is rotated by the action of the piston, the surface of the bed being thereby freed, when the spring will again effect a reversion of the parts, as before, and so on until the entire mass of the defecating-bed will have been deposited upon the filth-crown or drawn off through the waste-pipe. By a proper adjustment of the strength of the spring the operation may be made more or less sensitive or frequent, as may be desired. This arrangement insures the longest possible duration of the defecating-bed, as the effect of the apparatus simulates in many features the governor of a steam-engine.

To renew the bed at any time, it is simply required to remove the cover 35 of the hand or "man" hole in the upper crown-sheet and refill the cylinder to the desired height, when replace the plate and the apparatus is again ready for operation.

The form of the grate-bars 36, Figs. 3, 4, 5, may be modified in various ways, adapting the grate to different duties and kinds of defecating material.

The gear is formed as a hollow annulus with the arms projecting downward, the connection to the grate being made at different parts of several grate-bars. In this wise the bottom of the grate offers a practically unobstructed passage to the fluid upward, and to the effete defecating material and foreign matter downward. The teeth of the wheel are also formed upon the lower surface, and, with the pinion, are also preferably formed beveled each to the other; hence there is no tendency for the teeth to become clogged and inoperative.

I claim—

1. The combination of the cylinder or casing, a grate for supporting the defecating material, supported to revolve within said casing, means, substantially as described, for turning the grate, an inlet-pipe and waste-pipe communicating with the cylinder below the defecating material and provided with cocks, and an outlet-pipe provided with a cock and communicating with the cylinder above the defecating material, substantially as described.

2. In combination, a cylinder, a bed of defecating material, a grate sustaining said bed, and means for ingress and egress of fluid, the said grate being pivotally mounted and capable of being rotated, substantially as and for the purpose specified.

3. The cylinder-grate sustaining the defecating material, combined with a gear at or below the lower face of the grate, a pinion, and means for rotating the pinion from outside of the cylinder, for the purpose set forth.

4. The grate, upon the lower surface of which is formed or secured a gear adapted to intermesh a pinion and to be rotated thereby, and having downwardly-projecting arms ending as a central pivot, in combination with the girder, the cylinder, and the defecating bed, substantially as specified.

5. The combination, with a filter having ingress and egress chambers, of the differential motor apparatus consisting of a sub cylinder containing a diaphragm or piston and a spring, substantially as described, one compartment of the sub-cylinder being connected with the main ingress-chamber and the other compartment of the sub-cylinder with the main egress-chamber, and the piston connected with the apparatus desired to be operated, whereby an excess of pressure in the ingress-chamber above any desired normal pressure will impart motion to the piston and its connections, substantially as set forth.

6. In combination, the cylinder containing ingress and egress chambers, the defecating-bed, the grate pivotally supported, and the differential motor, substantially as described, and connections between the grate and motor, substantially as described, whereby the said grate is rotated by the differential action of the pressure within the main cylinder, as herein set forth.

In testimony whereof I have signed my name to this specification in the presence of two subscribing witnesses.

JOHN THOMSON.

Witnesses:
MAURICE B. FLYNN,
CHARLES C. BARTON.